(12) United States Patent
Daniel (10) Patent No.: US 9,807,349 B1
(45) Date of Patent: Oct. 31, 2017

(54) COVERT RECORDING ALARM APPARATUS FOR VEHICLES

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 188 days.

(21) Appl. No.: 14/496,163

(22) Filed: Sep. 25, 2014

Related U.S. Application Data (60) Provisional application No. 61/883,248, filed on Sep. 27, 2013.

(51) Int. Cl.
| | |
|---|---|
| H04N 7/18 | (2006.01) |
| G06F 17/00 | (2006.01) |
| G08C 19/00 | (2006.01) |
| G08B 13/00 | (2006.01) |
| G06K 9/00 | (2006.01) |

(52) U.S. Cl.
CPC ..................................... *H04N 7/18* (2013.01)

(58) Field of Classification Search
None
See application file for complete search history.

(56) References Cited

U.S. PATENT DOCUMENTS

| | | | | |
|---|---|---|---|---|
| 2002/0003571 A1* | 1/2002 | Schofield | ............... | B60C 23/00 348/148 |
| 2006/0095175 A1* | 5/2006 | deWaal | ................. | G07C 5/008 701/31.4 |
| 2007/0005609 A1* | 1/2007 | Breed | ................. | B60N 2/2863 |
| 2009/0022362 A1* | 1/2009 | Gagvani | ............... | G06T 7/2053 382/100 |
| 2010/0156632 A1* | 6/2010 | Hyland | ................. | G08B 25/08 340/540 |
| 2013/0141247 A1* | 6/2013 | Ricci | ........................ | G06F 9/54 340/870.01 |
| 2013/0198737 A1* | 8/2013 | Ricci | ....................... | G06F 13/14 717/174 |
| 2013/0198802 A1* | 8/2013 | Ricci | ....................... | H04L 63/10 726/1 |
| 2014/0143839 A1* | 5/2014 | Ricci | ..................... | H04W 12/06 726/4 |
| 2014/0192194 A1* | 7/2014 | Bedell | ...................... | B60R 1/00 348/148 |
| 2014/0306799 A1* | 10/2014 | Ricci | ........................ | B60Q 1/00 340/5.83 |
| 2014/0309806 A1* | 10/2014 | Ricci | ........................ | B60Q 1/00 701/1 |
| 2014/0375476 A1* | 12/2014 | Johnson | ................. | G08G 1/143 340/932.2 |

* cited by examiner

*Primary Examiner* — Reza Aghevli
(74) *Attorney, Agent, or Firm* — Alberto Interian, III, Esq.

(57) ABSTRACT

The present invention relates generally to a covert recording alarm apparatus for vehicles that includes one or more sensors strategically placed within the vehicle, e.g. in the car lock knob that are configured for detecting any instrument, added weight or pressure being applied to a vehicle's entry points. If any such force is detected, the apparatus' sensor(s) trigger an the image capturing mechanism to begin taking pictures and videos of the theft activity which is transmitted as an alert to legal authorities, a monitoring service and/or the owner/operator's mobile phone where it is published and displayed as a video, text or email such that the appropriate action can be taken.

23 Claims, 6 Drawing Sheets

COVERT RECORDING ALARM APPARATUS FOR VEHICLES

PRIORITY CLAIM

This patent application is a Non-Provisional patent application and claims priority under 35 U.S.C. §119(e) to U.S. Provisional Patent Application Ser. No. 61/883,248, titled "Covert Recording Alarm Apparatus for Vehicles" filed Sep. 27, 2013. The entire disclosure of the aforementioned provisional patent application is incorporated by reference as if fully stated herein.

FIELD OF THE INVENTION

The present invention relates generally to a covert recording alarm apparatus for vehicles that includes one or more sensors strategically placed within the vehicle, e.g. in the car lock knob. These sensors may be configured to detect any instrument, added weight or pressure being applied to a vehicle's entry points. If any such force is detected, the sensor(s) may trigger tan image capturing mechanism or device to start taking pictures and videos of the theft activity which may then be transmitted as an alert to legal authorities, a monitoring service and/or the owner/operator's mobile phone where it is published and displayable as a video, text or email such that the appropriate action can be taken.

DESCRIPTION OF THE PRIOR ART

The threat of vehicular theft is real and must be addressed by car owners and operators, especially urban dwellers. Criminals steal cars for a variety of reasons including but not limited to the high resale value of certain cars and or their component parts, easy access to unattended vehicles, opportunistic thefts, or even carjacking where there is a forceful taking of a vehicle by actual force or threat of force from its owner or operator.

Several preventative devices have evolved over the years to reduce the likelihood of a vehicle getting stolen. These include physical barriers, making the effort of stealing the vehicle more difficult, e.g. wheel locking devices, e.g. the Club, and immobilizers that prevent the vehicle from starting unless the correct computerized key is present in the ignition. The immobilizers work by locking the steering wheel and disabling the ignition. Other theft deterrent devices include car alarms, microdot identification tags, which allow individual parts of a vehicle to be identified, kill switch circuits and Vehicle Identification Number etchings. All of the above have caused a reduction in vehicular theft but there still are no means of actually notifying the owner/operator or even lawful authorities of the theft while in progress. Moreover, prosecution of vehicular thieves are often hampered by an inability to identify the thief because the theft is usually over within a short period of time and generally the vehicle and thief are long gone before the law enforcement arrives on the scene. Thus, there needs to be a means of alerting owner/operators and/or law enforcement of ensuing vehicular theft while the theft is in progress.

This invention satisfies these long felt needs in a new and novel manner and solves the foregoing problems that the prior art has been unable to resolve. For a further and more fully detailed understanding of the present invention, various objects and advantages thereof, reference is made to the following detailed description and the accompanying drawings. Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

An aspect of an embodiment of the present invention contemplates a method of providing covert security to a vehicle, where the method includes the steps of monitoring the vehicle's interior, environs and external body, detecting one or more activities within the vehicle's interior, environs and/or external body, activation of an image capturing and recording mechanism upon determination that an alert condition has occurred or is in the process of occurring and monitoring the alert condition. The method also contemplates the steps of the method being enabled by way of one or more processor(s).

In an aspect of an embodiment of the present invention, the vehicle monitoring may be undertaken or conducted by one or more one sensor(s).

In an aspect of an embodiment of the present invention, the method may additionally include the step of determining whether the one or more one activities is an alert condition.

In an aspect of an embodiment of the present invention, the method may additionally include the step of recording the alert condition. In one aspect, this may be done by use of an imaging and recording mechanism in communication with the one or more sensor(s) and/or the processor(s).

In an aspect of an embodiment of the present invention, the method may additionally include the step of live transmission of the monitored alert condition to a remote location or device.

In an aspect of an embodiment of the present invention, the method may additionally include the steps of transmission and display of the alert condition at a remote location or device.

In an aspect of an embodiment of the present invention, the method may additionally include the step of scanning an individual's face involved in the one or more one activities when it has been determined that an alert condition has not occurred. A further aspect may include the step of determining whether the individual is an authorized individual. In another aspect, the method may include the step of performing a previously programmed vehicle operation when the individual has been determined to be an authorized individual.

Additional aspects of embodiments of the present invention, contemplate computer program product which may include a computer usable medium having control logic stored on it for causing a computer processor to provide covert vehicle security, and where the control logic may include computer readable program code for: monitoring the vehicle's interior, environs and external body, detecting one or more one activities within the vehicle's interior, environs and/or external body, activation of an image capturing and recording mechanism upon determination of an alert condition and monitoring the alert condition.

In another aspect of an embodiment of the present invention, the computer program product may further include computer readable program code for enabling the vehicle monitoring by one or more one sensor(s) in communication with the computer processor.

In another aspect of an embodiment of the present invention, the computer program product may include computer readable program code for determining whether the one or more one activities is an alert condition.

In another aspect of an embodiment of the present invention, the computer program product may include computer readable program code for enabling recording of the alert condition.

In another aspect of an embodiment of the present invention, the computer program product may include computer readable program code for enabling the live transmission of the monitored alert condition to a remote location or device.

In another aspect of an embodiment of the present invention, the computer program product may include computer readable program code for enabling the transmission and display of the alert condition at a remote location or device.

In another aspect of an embodiment of the present invention, the computer program product may include computer readable program code for enabling the scanning of an individual's face involved in the one or more one activities when it has been determined that an alert condition has not occurred.

In another aspect of an embodiment of the present invention, the computer program product may include computer readable program code for determining whether the individual is an authorized individual.

In another aspect of an embodiment of the present invention, the computer program product may include computer readable program code for enabling the performance or execution of a previously programmed vehicle operation when the individual has been determined to be an authorized individual.

In yet another aspect of an embodiment of the present invention, also disclosed is a covert vehicle security system having one or more processors, one or more covert locations within the vehicle, where the one or more covert location includes one or more sensor(s) in communication with the processor(s). The system may additionally include one or more one communication module(s), in communication with the processor(s) and computer executable code readable by the processor(s) which enables or are operative to monitor the vehicle's interior, environs and external body, detect one or more one activities within the vehicle's interior, environs and/or external body, activation of an image capturing and recording mechanism upon determination of an alert condition and monitor the alert condition.

In yet another aspect of an embodiment of the present invention, the covert security system may also include a mobile device in communication with the one or more communication module(s).

In yet another aspect of an embodiment of the present invention, the one or more one covert locations may further include an imaging and recording mechanism.

In yet another aspect of an embodiment of the present invention, the covert security system may also include a covert location mechanism used to move or focus the one or more one covert locations on or toward an activity within the vehicle.

In yet another aspect of an embodiment of the present invention, the covert security system may also include memory, in communication with the imaging and recording mechanism, where the memory may be used to store video and audio of the alert condition as recorded by the imaging and recording mechanism.

Systems

Figure 1:
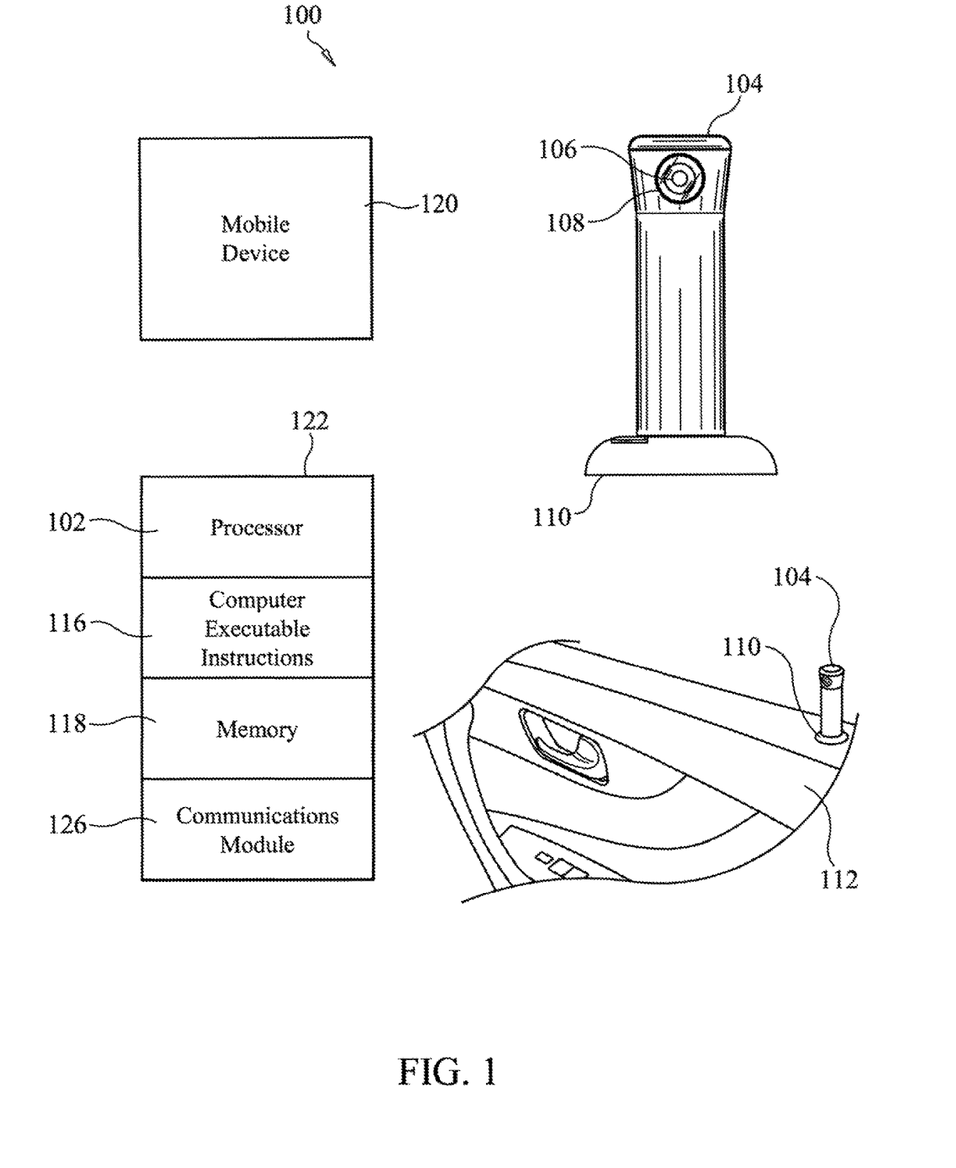
FIG. 1 illustrates an exemplary system according to an aspect of an embodiment of the present invention.
Figure 2:
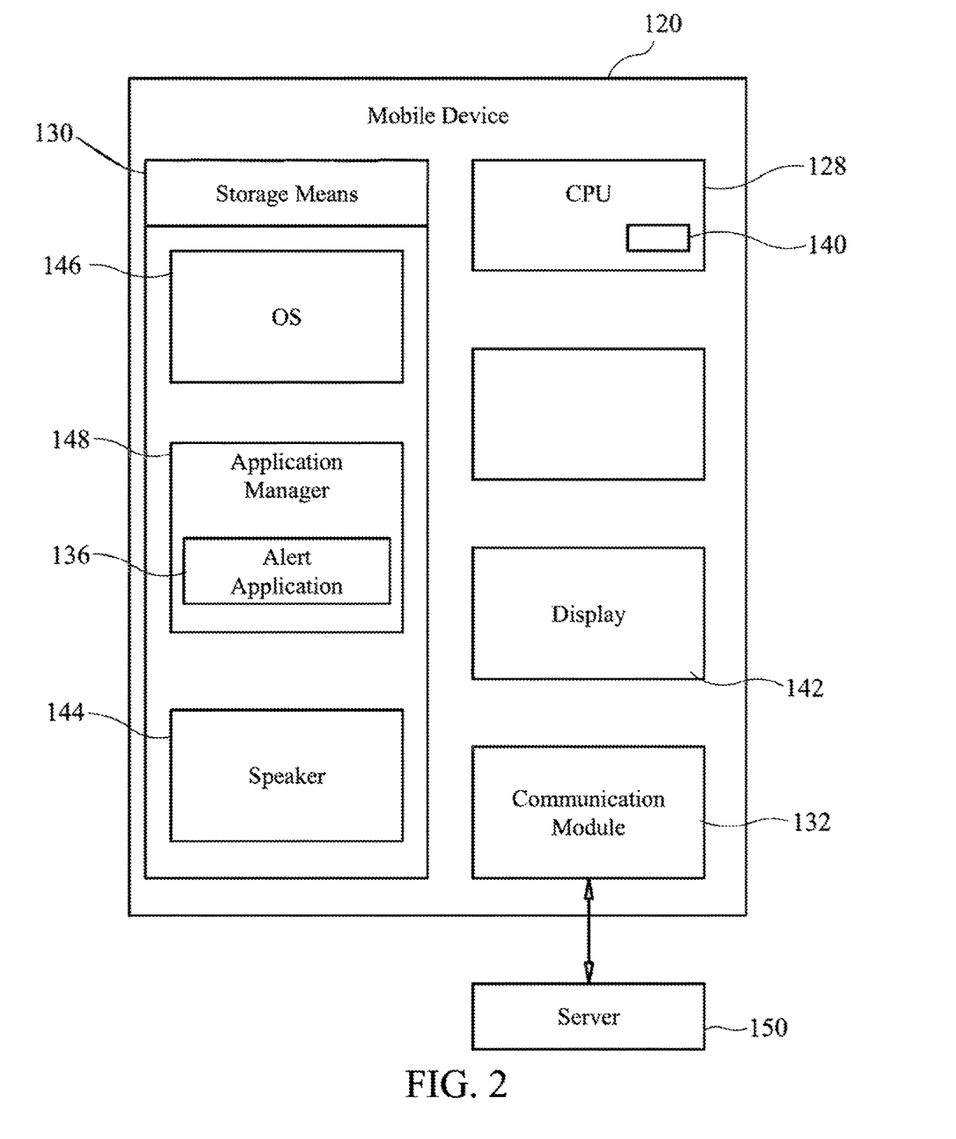
FIG. 2 illustrates an exemplary mobile device according to an aspect of an embodiment of the present invention.

Referring now to FIGS. 1 and 2 an exemplary vehicle security system 100 and mobile device 120 are shown according to aspects of embodiments of the present invention. Vehicle security system 100 may include processor(s) 102 electronically connected to sensor(s) 106 and computer executable instructions 116 readable by processor(s) 102 and operative to use sensor(s) 106 to detect a threat of force to vehicle 112 or forcible entry into vehicle 112. In an aspect of an embodiment of the present invention, processor(s) 102 may be a processor separate from the vehicle's internal computer system or may be part of the vehicle's existing computer system 122.

The terms "electronically connected," "electronic connection," and the like, as used throughout the present disclosure, are intended to describe any kind of electronic connection or electronic communication, such as, but not limited to, a physically connected or wired electronic connection and/or a wireless electronic connection.

In some aspects of embodiments of the present invention, processor(s) 102 may be any kind of processor, including, but not limited to, a single core processor, a multi core processor, a video processor, a central processing unit (CPU), a microprocessor, a front end processor, a coprocessor, and the like.

Sensor(s) 106 may be any kind of sensor, including, but not limited to, a video sensor, such as a camera, a 3D camera, a motion sensor, an infrared sensor, pressure sensor and the like. In some embodiments, sensor(s) 106 may include a 3D sensor, such as a time of flight sensor or structured light sensor, which may include any of those various embodiments developed or produced by Optrima NV, Witherenstraat 4-1040 Brussels, Belgium. Sensor(s) 106 may include a light source, which may be used to illuminate any objects in sensor 106's field of sensing. In preferred embodiments, sensor(s) 106 may be capable of observing a field of sensing which, in one aspect of an embodiment of the present invention, may include the entire interior of vehicle 112, vehicle 112's exterior and/or vehicle 112's environs. In another aspect of an embodiment of the present invention, sensor(s) 106 may be capable of scanning the face of an individual.

Sensor(s) 106 may be in wireless or wired electronic communication with one or more processor(s) 102. In an aspect of an embodiment of the present invention, sensor(s) 106 may be located in any part of vehicle 112's interior. In this case, for illustrative purposes only, sensor(s) 106 are shown to be located within a covert location such as car lock knob 104. Car lock knob 104 may further include a either a combination or each of an image capturing mechanism and recording mechanism 108. It should be noted that sensor(s) 106 and image capturing mechanism and recording mechanism 108 may be located in other parts of vehicle 112 and that their location shown here in car lock knob 104 is an example and for illustration primarily.

When sensor(s) 106 detects an alert condition for the vehicle 112, e.g. force, pressure or weight exerted, processor(s) 102 activate image capturing mechanism and recording mechanism 108 to capture and record the activity.

Recording device of image capturing mechanism and recording mechanism 108 may be any kind of recording device, such as, but not limited to, an audio recording device, such as a microphone, or a video recording device, such as a camera, or a combination of both an audio and a video recording device.

Processor(s) 102 may include computer executable instructions 116 that may be loaded directly on the processor 102, or may be stored in memory 118, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions 116 may be any type of computer executable instructions, which may be in the form of a computer program, the program being composed in any suitable programming language or source code, such as C++, C, JAVA, JavaScript, HTML, XML, and other programming languages.

In one embodiment, the computer executable instructions 116 may include object recognition software and/or firmware, which may be used to analyze data, such as an image or sound, captured by sensor(s) 106 and to determine, and consequently detect an alert condition, such as an illegal and/or unauthorized activity, an application of force to vehicle 112 or other threats to vehicle 112. Detecting the application of force to vehicle 112 may include sensing an instrument, weight or pressure applied to the vehicle's door, the vehicle door's locking mechanism, windows or other access points.

In one embodiment, the computer executable instructions 116 may be operative to control transmission of video 122 recorded by image capturing mechanism and recording mechanism 108 recipient(s) designated to receive alert(s) 124 when sensor(s) 106 detect an alert condition. In one aspect of an embodiment of the present invention, this may include a mobile device 120 such that the owner/operator may have a visual of the activity as detected in real-time. In an aspect of an embodiment of the present invention, alert(s) 124 may be a local alert, such as an audible or visual alert capable of being perceived by the persons in local proximity of vehicle 112. In yet another embodiment, alert(s) 124 may be a remote alert, such as an alert sent by vehicle security system 100 to a remote device, user, recipient, device or station, where alert(s) 124 may be any kind of alert, including, but not limited to a picture, video or live transmission of the detected activity being transmitted as an e-mail, and SMS message, a phone call, and the like or a combination of the foregoing. In some embodiments, if a threat is detected, alert(s) 124 may be sent to a remote station notifying a monitoring service or law enforcement authorities of the activity/theft while it's in progress. Alternatively, the owner/operator or the monitoring service may notify the authorities of the unauthorized use of force to gain access to the vehicle if law enforcement was not previously notified.

In a further embodiment, vehicle security system 100 may employ a mode of communicating with a mobile device 120. This may be made possible by communications module 126 which may be resident within vehicle 112 as part of vehicle 112's computer system 122. Communications module 126 may have a corresponding component resident on the recipient's mobile device 120. Communication module 126 may be electronically connected to processor(s) 102. In some embodiments, communication module 126 may include a Bluetooth module, a USB port, an infrared port, a network adapter, such as a Wi-Fi card, and the like. In a further embodiment, the computer executable instructions 116 may be operative to trigger an alert if sensor(s) 106 detect any objects, weight or pressure being applied to the vehicle 112's door, car lock knob 104, car lock mechanism 110, vehicle 112's other entry points and/or other parts of vehicle 112.

Throughout the present disclosure, it should be understood that computer executable instructions 116, such as those in vehicle security system 100, may be used to control, activate, manipulate and use various embodiments of systems and components thereof, such as sensor(s) 106, processor(s) 102, communication module 126 and the mobile device 120, etc.

Mobile device 120 may be any type of electronic computerized communication device configured to communicate with other mobile devices, such as but not limited to, cellular phones (e.g., an iPhone, Android, Palm, Blackberry, or any "smart phone" as are generally known and used in the art), location-aware portable phones (utilizing systems such as GPS), a personal computer, server computer, or laptop or netbook computer, a personal digital assistant ("PDA") Windows CE device, a laptop computer, a tablet personal computer, a portable screen, a portable processing device and/or any other portable device capable of communicating wirelessly over a computer network, local area network, wide area network such as the Internet, or any other type of network device that may communicate over a network.

Mobile device 120 may include various hardware components, e.g. processor(s) 128, storage means 130, and communication module. Processor(s) 128 may be any type of processor, such as, but not limited to, a central processing unit (CPU), a microprocessor, a video processor, a front end processor, a coprocessor, a single-core central processor, a multi-core processor, and the like. Processor(s) 128 may be programmed for receiving alerts 124 by way of and/or being enabled by, theft alert application ("alert app") 136 when sensor(s) 106 detect a threat, while the mobile device 120 is powered on, and the like. In another embodiment, alert app 136 may notify the vehicle's owner/operator of new alerts, which may be displayed on the mobile device's display 138 in, for example a graphical, audio, video, pictorial and/or text format.

In some embodiments, alert app 136 may be activated once the mobile device 120 is turned on and at any time the owner/operator may view a live feed of the vehicle as parked to check on the status of the parked vehicle 112. In some embodiments, alert app 136 may be activated by launching, for example an icon displayed on display 138 of mobile device 120. When a user selects the icon (e.g. by touching a touch screen, or selecting it using a pointing device, roller ball, arrow keys, or other controller), processor(s) 128 launches alert app 136 by execution of computer executable instructions 140, which then activate display module 142 to control and display alert app 136 on display 138.

Mobile device 120 may include one or more storage or memory 130 either electrically or mechanically connected to processor(s) 128. In the case of electronic connections, the electronic connections may be wired and/or wireless connections. Storage or memory 130 may include a storage, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Storage or memory 130 may be used to store information, such as live and/or recorded alerts 124 as recorded by imaging and recording mechanism 108, and the like. Information stored on the mobile device's storage or memory 130 may be retrieved using processor(s) 128 and may be published by push notification on display 138 or audibly broadcasted over speaker 144.

Mobile device 120 may be equipped with communication module 132, which may be either electrically or mechanically connected to the processor(s) 128. In the case of electronic connections, the electronic connections may be wired and/or wireless. In some embodiments, communication module 132 may employ a short range wireless protocol, such as, but not limited to, a radio frequency transceiver, a radio frequency receiver, and/or a radio frequency transmitter for communicating over the Internet. In aspects of embodiments where the wireless communication module 132 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, communication module 132 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication module 132 may be enabled to transmit or receive electronic communications, i.e. electronic data, audio, videos, text, pictures, graphs and the like via a short range wireless protocol, such as, but not limited to, a radio frequency receiver, a radio frequency transmitter, or a radio frequency transceiver.

Processor(s) 128, positioned within the mobile device 120 and disposed in communication with the storage or memory 130 may include computer executable instructions 140 readable and executable by processor(s) 128, where the computer executable instructions 140 are operative to perform all the necessary functions for the vehicle security system 100, mobile device 120 and methods disclosed herein, including but not limited to automatically launching the alert app 136 and receiving/sending live alerts 124 to/from mobile device 120. Computer executable instructions 140 may be loaded directly on the mobile device's processor(s) 128, or may be stored in mobile device's storage or memory 130, which may include, but is not limited to, computer readable media, such as, but not limited to, a hard drive, a solid state drive, a flash memory, random access memory, CD-ROM, CD-R, CD-RW, DVD-ROM, DVD-R, DVD-RW, and the like. Computer executable instructions 140 may be any type of computer executable instructions 140, which may be in the form of a computer program, the program being composed in any suitable programming language or source code, such as C++, C, JAVA, JavaScript, HTML, XML, and other programming languages.

Alert app 136, may include computer executable instructions 140 readable and executable by processor(s) 128 and configured to perform any and/or all the necessary functions for vehicle security system 100 and methods of the invention, which may include any one or more of the following: alerting user of the theft alert 124; displaying alert 124 on mobile device's display 138, and the like.

Display 138 may be any one of a liquid crystal display ("LCD") screen, a light emitting diode ("LED") display, touchpad or touch screen display, and/or any other means known in the arts for emitting a visually perceptible output. Mobile device's processor(s) 128 may be in electronic communication with display 138. In other embodiments, display 138 may be wirelessly connected to processor(s) 128. Display 138 may include control means, such as, but not limited to, a touch screen, a stylus, and the like. In some embodiments, display 138 may be electronically connected to a mobile device 120 according to the hardware and software protocols that are known and used in the art.

Mobile device 120 may also include software components that may be stored in the storage or memory 130. Storage or memory 130 may include computer storage media, for example volatile memory, non-volatile memory, data storage devices, or the like. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by mobile device 120. Mobile device 120 may also contain an input element for inputting data and an output element for displaying data.

Mobile device 120 may further include operating system 14 and application manager 148. Alert app 136 may be an independent component or may be incorporated into the operating system 146. Alert app 136 may be a computer-executable component readable and executable by the processor(s) 128, where the alert app 136 intercepts incoming alerts 124, pushes notification to the mobile device's display 138 notifying user of incoming alert 124 and displays the alerts 124 on the mobile device's display 138.

Application manager 148 may include computer-executable components that operate in mobile device 120 and may be implemented in a variety of ways. In one embodiment of the invention, application manager 148 may use one or more computer-executable components for interacting with alert app 136. In another embodiment, alert app 136 is incorporated in application manager 148 to receive information from the input element, to communicate with, and/or to control the operations of alert app 136.

Alert app 136 may include in part of a browser, such as for use on the mobile device 120, or a similar browsing device. Alert app 136 may be any type of software application, such as a standalone application designed to run on a mobile platform, such as a mobile device running an operating system, such as iOS™, Android™, Windows Mobile™, Blackberry™, and the like. Alert app 136 may be operative for an iPhone, any other "smart phone," mobile device, cellular phone, PDA, GPS or any other mobile device 120 capable of handling electronic transactions dealing with dynamic content, object, application, or software. In some embodiments, the alert app 136 may be designed to run on a social network platform, such as FACEBOOK™ or JUSTSYNC™. In some embodiments, alert app 136 may reside on a remote server computer 150 and may be downloadable from the server computer 150 or may otherwise reside in the mobile device's local storage means 130. For example, in one embodiment, the alert app 136 may be on a mobile device (such as an iPhone, Blackberry, or other "smart phone") and the full-sized software program may be on a computer 128, where communications may occur over a network or directly, either wired or wirelessly.

Alert app 136 may be configured to publish alerts 124 in any one or more of the following formats: audio, video, pictorial, text message, graph or an alarm. Alert app 136 may be configured to display alerts 124 directly on mobile device's display 138 upon receipt of the alert 124. Alert app 136 interacts with the mobile device's display by selecting and controlling the viewing space on the mobile device's display as shown on the mobile device's display 138, such that the alert app 136 and any alerts 124 are able to play directly on display 138 with full functionality for review and control including but not limited to fast forward, rewind, stop, pause, store, delete, forward and the like.

Methods

Figure 3:
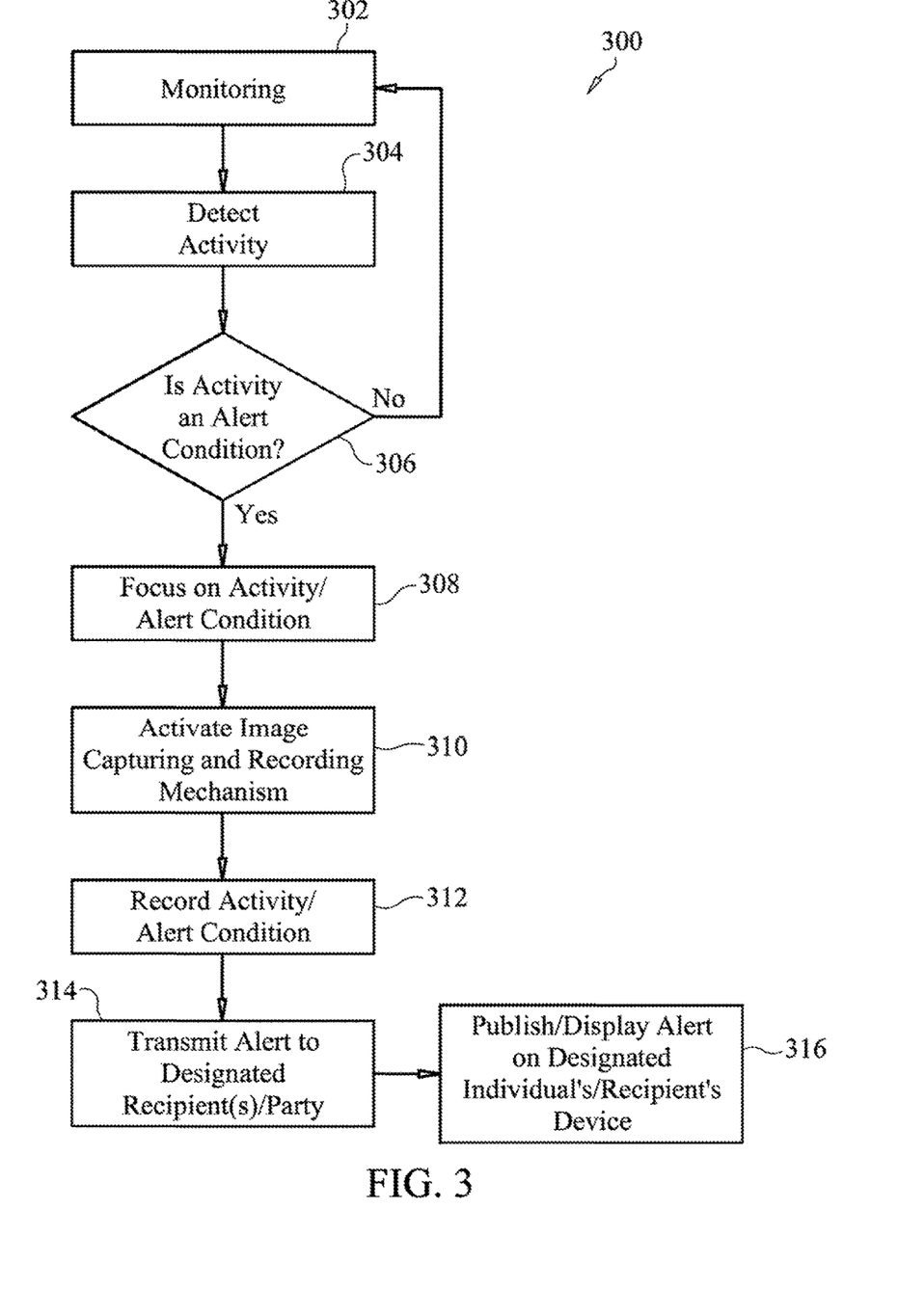
FIG. 3 illustrates an exemplary process according to an aspect of an embodiment of the present invention.

Referring now to FIG. 3, an exemplary process 300 according to an aspect of an embodiment of the present invention, is shown. Process 300 may begin with sensor(s) 106 monitoring vehicle 112 and its environs in step 302. Upon detection of activity within or on vehicle 112 by sensor(s) 106 in step 304, vehicle security system 100 proceeds to step 306 to determine whether the detected activity is an alert condition e.g. application of an instrument, force, weight and/or pressure on vehicle 112 or its access points such that the sensor realizes that a theft is in progress and/or an illegal activity is taking place. In one aspect, this determination may include checking as to whether or not the detected activity fits certain predetermined parameters. In one aspect of an embodiment of the present invention, if no alert condition is determined in step 306, the process reverts back to step 302 for continued monitoring of vehicle 112. If, however, it is determined that an alert condition has occurred or is occurring, vehicle security system 100 would then train or focus sensor(s) 106 toward the source of the activity in step 308. In one aspect of an embodiment of the present invention, this is made possible by car lock knob mechanism 110 which may be able to turn car lock knob 104 toward the activity thereby focusing sensor(s) 106 and imaging and recoding mechanism 108 on the activity. Once sensor(s) 106 have been trained or focused on the activity, image capturing and recording apparatus 108 would be activated in step 310 to begin recording the activity in step 312. In one aspect of an embodiment of the present invention, vehicle security system 100 may generate an alert 124 upon the determination that the activity is an alert condition. Alert 124 may then be sent, in step 314 to a designated party or parties and, in step 316, may be published or displayed on the recipient's receiving device which may, in one aspect of an embodiment of the present invention may be mobile device 120. In one aspect of an embodiment of the present invention, recording, transmission and publication/display of the alert condition may continue until the alert condition is no longer detected by sensor(s) 106. In another aspect, may continue until an operator resets vehicle security system 100 and/or vehicle security system 100 resets itself according to a predetermined setting which may be based on time.

In one aspect of an embodiment of the present invention, vehicle security system 100 may immediately transmit a live feed of the activity upon activation of image capturing and recording apparatus 108 to the designated recipient in which case the recipient would be able to see the activity live on his/her device, which, in one aspect of an embodiment of the present invention, this may be on mobile device 120.

Transmission of alert 124, in one aspect of an embodiment of the present invention, may be made to the legal authorities, a monitoring service and/or the owner/operator of vehicle 112. The owner/operator has the flexibility of determining who gets alerted when an alert is detected when setting up alert app 136. In another aspect of an embodiment of the present invention, process may involve transmitting alert 124 to the designated entity, e.g. the individual, where the alert app 136 uses push notification technology to publish notification of the received input for the incoming electronic transmission.

Figure 4:
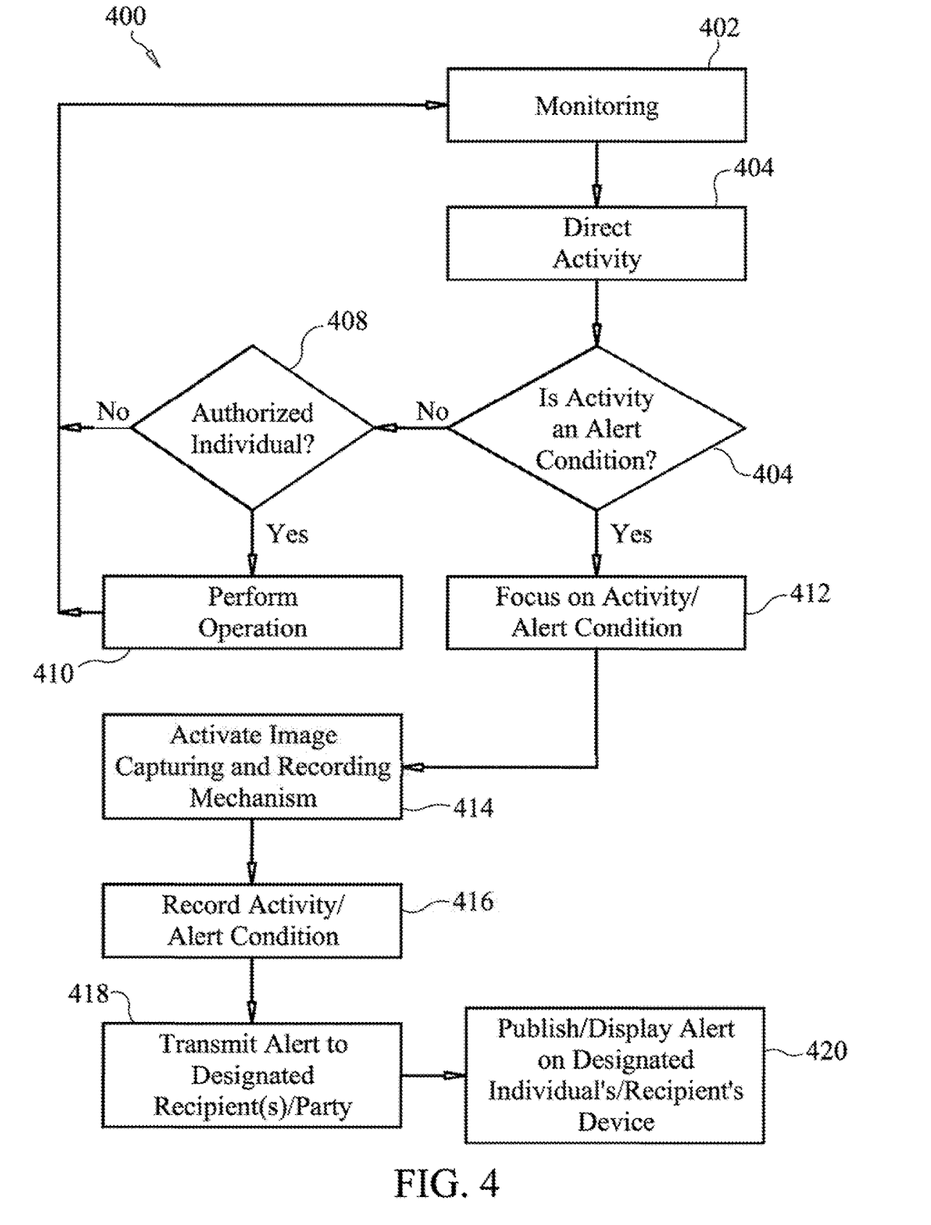
FIG. 4 illustrates another exemplary process according to an aspect of an embodiment of the present invention.
Figure 5:
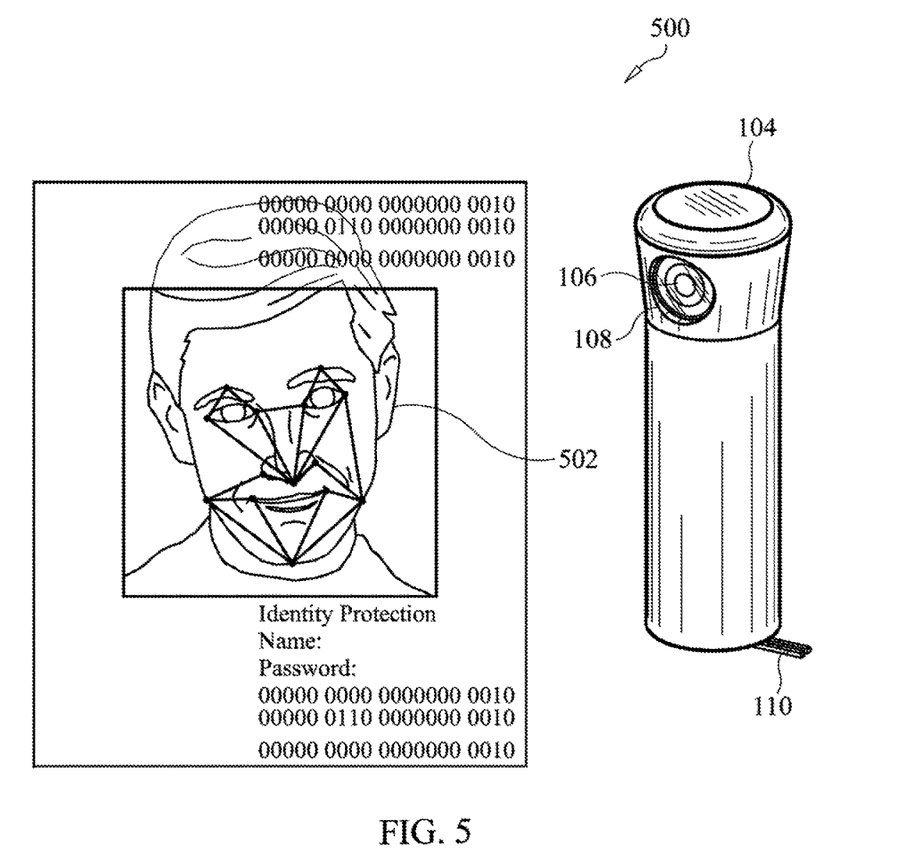
FIG. 5 illustrates an exemplary face recognition and scanning regime according to an aspect of an embodiment of the present invention.

Referring now to FIGS. 4 and 5 another exemplary process 400 and a face recognition and scanning regime 500 according to aspects of embodiments of the present invention are shown. Process 400 may begin with sensor(s) 106 monitoring vehicle 112 and its environs in step 402. Upon detection of activity within or on vehicle 112 by sensor(s) 106 in step 404, vehicle security system 100 proceeds to step 406 to determine whether the detected activity is an alert condition e.g. application of an instrument, force, weight and/or pressure to/on vehicle 112's access points such that sensor(s) 106 realizes that a theft is in progress and/or an illegal activity is taking place. In one aspect, this determination may include checking as to whether or not the detected activity fits certain predetermined parameters. In one aspect of an embodiment of the present invention, if no alert condition is determined in step 406, the process proceeds to step 408 where vehicle security system 100 determines whether or not the activity is being conducted by an authorized individual. In one aspect of an embodiment of the present invention, this may be done by having sensor(s) 106 focus on and scan the face 502 of the individual involved in the activity. In one aspect of an embodiment of the present invention, this may be made possible by car lock knob mechanism 110 which may be able to turn car lock knob 104 toward the individual involved in the activity thereby focusing sensor(s) 106 and imaging and recoding mechanism 108 on the individual's face 502. Once sensor(s) 106 have been trained or focused on the individual's face 502, sensor(s) 106 may then scan it.

Sensor(s) 106, after scanning the individual's face, relays the scan to processor(s) 102 of vehicle security system 100 to determine whether or not the scanned face is that of an authorized individual. In one aspect, an authorized individual may be the vehicle owner and/or another individual whose face would have been previously scanned and saved on storage or memory 118. In another aspect of an embodiment of the present invention, an authorized individual would be one who has been programmed into the vehicle security system 100 as being authorized to, inter alia, enter and operate vehicle 112. If vehicle security system 100 determines that the individual is an authorized individual, then the process proceeds to step 410 where vehicle security system 100 may the operations as previously programmed in response to an authorized individual's activity e.g. opening or unlocking vehicle 112. In one aspect of an embodiment of the present invention, the operation may be to open the doors of vehicle 112 or to light up the interior of vehicle 112. In another aspect of an embodiment of the present invention, these operations may be programmed using alert app 136.

Following step 410, the process reverts back to step 402 for continued monitoring of vehicle 112. If, however, it is determined, in step 406 that an alert condition has occurred or is occurring, vehicle security system 100 would then train or focus sensor(s) 106 toward the source of the activity in step 412. Once sensor(s) 106 have been trained or focused on the activity, image capturing and recording apparatus 108 would be activated in step 414 to begin recording the activity in step 416. In one aspect of an embodiment of the present invention, vehicle security system 100 may generate an alert upon the determination that the activity is an alert condition. This alert may then be sent, in step 418 to a designated recipient(s) and, in step 420, may be published or displayed on the recipient(s)' receiving device which may, in one aspect of an embodiment of the present invention may be mobile device 120. In one aspect of an embodiment of the present invention, recording, transmission and publication/display of the alert condition may continue until the alert condition is no longer detected by sensor(s) 106. In another aspect, may continue until an operator resets vehicle security system 100 and/or vehicle security system 100 resets itself according to a predetermined setting which may be based on time.

In one aspect of an embodiment of the present invention, vehicle security system 100 may immediately transmit a live feed of the activity upon activation of image capturing and recording apparatus 108 to the designated recipient in which case the recipient would be able to see the activity live on his/her device. In one aspect of an embodiment of the present invention, this may be on mobile device 120.

Hardware and Operating Environment

This section provides an overview of example hardware and the operating environments in conjunction with which embodiments of the inventive subject matter can be implemented.

A software program may be launched from a computer readable medium in a computer-based vehicle security system 100 to execute the functions defined in the software program. Various programming languages may be employed to create software programs designed to implement and perform the processes 300 and 400 disclosed above. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 6 below.

Figure 6:
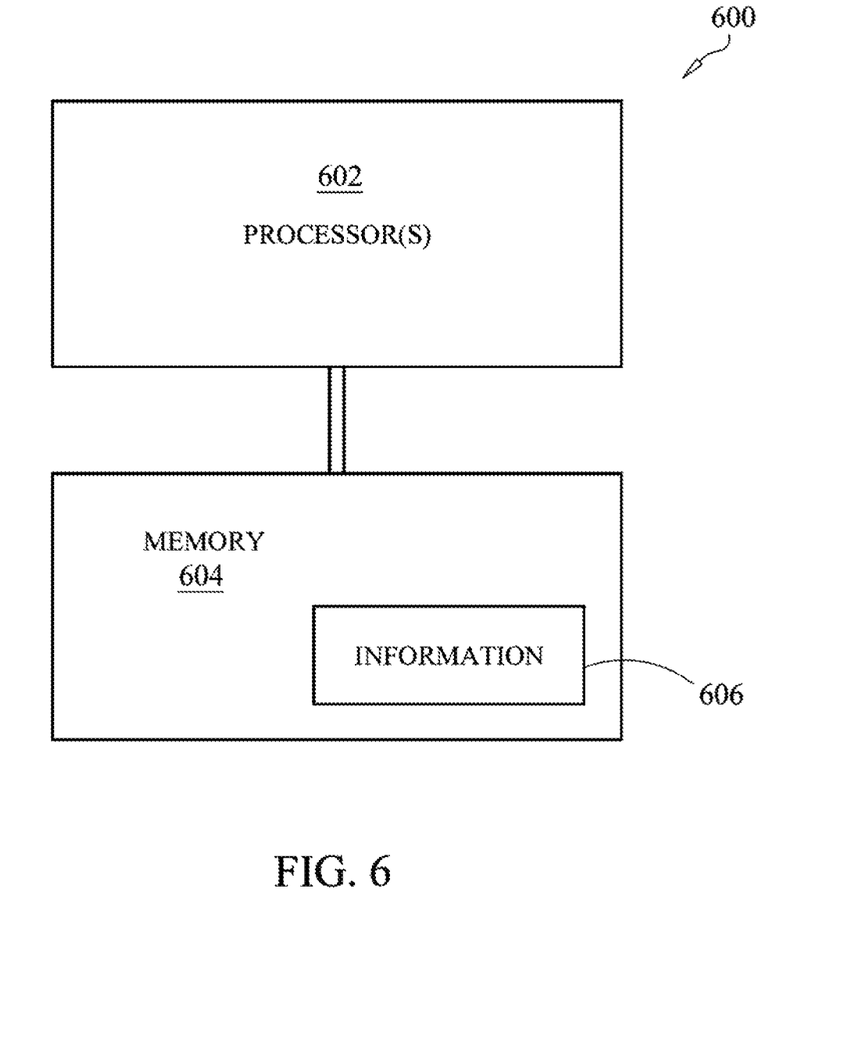
FIG. 6 illustrates an exemplary block diagram showing some system components/apparatus according to an aspect of an embodiment of the present invention.

FIG. 6 is a block diagram representing an apparatus 600 according to various embodiments. Such embodiments may comprise a computer, a memory system, a magnetic or optical disk, some other storage device, or any type of electronic device or system. The apparatus 600 may include one or more processor(s) 604 coupled to a machine-accessible medium such as a memory 602 (e.g., a memory including electrical, optical, or electromagnetic elements). The medium may contain associated information 604 (e.g., computer program instructions, data, or both) which, when accessed, results in a machine (e.g., the processor(s) 604) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A method of securing a vehicle, using at least one processor, the method comprising the steps of:
monitoring the vehicle's interior, environs and external body;
detecting at least one activity within the vehicle's interior, environs and/or external body;
turning a lock knob of the vehicle towards the at least one detected activity thereby focusing at least one sensor and an image capturing and recording mechanism on the at least one activity;
activation of the image capturing and recording mechanism upon determination of an alert condition; and
monitoring the alert condition.

2. The method according to claim 1, wherein the vehicle monitoring is conducted by at least one sensor in communication with the at least one processor.

3. The method according to claim 1, further comprising the step of determining whether the at least one activity is an alert condition.

4. The method according to claim 1, further comprising the step of recording the alert condition.

5. The method according to claim 1, further comprising the step of transmitting the alert condition to a remote location or device.

6. The method according to claim 1, further comprising the steps of displaying the alert condition at a remote location or device.

7. The method according to claim 1, further comprising the step of scanning an individual's face involved in the at least one activity when it has been determined that an alert condition has not occurred.

8. The method according to claim 7, further comprising the step of determining whether the individual is an authorized individual.

9. The method according to claim 8, further comprising the step of performing a previously programmed vehicle operation when the individual has determined to be an authorized individual.

10. A non-transitory computer readable medium having instructions stored thereon that when executed by a processor causes the processor to:
monitor the vehicle's interior, environs and external body;
detect at least one activity within the vehicle's interior, environs and/or external body;
turn a lock knob of the vehicle towards the at least one detected activity thereby focusing at least one sensor and an image capturing and recording mechanism on the activity;
activate the image capturing and recording mechanism upon determination of an alert condition; and
monitor the alert condition.

11. The non-transitory computer readable medium of claim 10, wherein the vehicle monitoring is conducted by at least one sensor in communication with said processor.

12. The non-transitory computer readable medium of claim 10, wherein the instructions are further configured to cause the processor to determine whether the at least one activity is an alert condition.

13. The non-transitory computer readable medium of claim 10, wherein the instructions are further configured to cause the processor to record the alert condition.

14. The non-transitory computer readable medium of claim 10, wherein the instructions are further configured to cause the processor to transmit the alert condition to a remote location or device.

15. The non-transitory computer readable medium of claim 10, wherein the instructions are further configured to cause the processor to display the alert condition at a remote location or device.

16. The non-transitory computer readable medium of claim 10, wherein the instructions are further configured to cause the processor to scan an individual's face involved in the at least one activity when it has been determined that an alert condition has not occurred.

17. The non-transitory computer readable medium of claim 16, wherein the instructions are further configured to cause the processor to determine whether the individual is an authorized individual.

18. The non-transitory computer readable medium of claim 17, wherein the instructions are further configured to cause the processor to perform a previously programmed vehicle operation when the individual has been determined to be an authorized individual.

19. A covert vehicle security system comprising of:
at least one processor;
at least one covert location within the vehicle, wherein the at least one covert location comprising of at least one sensor in communication with said at least one processor;
at least one communication device, in communication with the at least on processor; and
at least one non-transitory computer-readable medium comprising computer-executable instructions, which when executed by the at least one processor causes the at least one processor to:
monitor the vehicle's interior, environs and external body;
detect at least one activity within the vehicle's interior, environs and/or external body;
turn a lock knob of the vehicle towards the at least one detected activity thereby focusing the at least one sensor and an image capturing and recording mechanism on the at least one activity;
activate of the image capturing and recording mechanism upon determination of an alert condition; and
monitor the alert condition.

20. The system according to claim 19, further comprising a mobile device in communication with the at least one communication device.

21. The system according to claim 19, wherein the at least one covert location further comprises an imaging and recording mechanism.

22. The system according to claim 19, further comprising a covert location mechanism used to move the at least one covert location toward an activity within the vehicle.

23. The system according to claim 21, further comprising memory, in communication with the imaging and recording mechanism, wherein the memory is used to store video and audio of the alert condition as imaging and recording mechanism by the imaging and recording mechanism.

* * * * *